United States Patent [19]

Howe, Jr.

[11] 4,333,694
[45] Jun. 8, 1982

[54] ANTIFRICTION BEARING WITH REMOVABLE SEAL MEANS

[75] Inventor: Ralph S. Howe, Jr., New Britain, Conn.

[73] Assignee: Textron Inc., Providence, R.I.

[21] Appl. No.: 208,043

[22] Filed: Nov. 18, 1980

[51] Int. Cl.³ ............................................. F16C 33/78
[52] U.S. Cl. .............................. 308/187.2; 277/212 F
[58] Field of Search .............. 308/187.2, 187.1, 36.1, 308/36.2; 277/188 R, 188 A, 212 F

[56] References Cited

U.S. PATENT DOCUMENTS

| 2,734,757 | 2/1956 | Martin | 308/187.2 |
| 3,748,003 | 7/1973 | Barber | 308/187.2 |
| 3,923,351 | 12/1975 | Frost | 308/187.1 |
| 4,025,149 | 5/1977 | Spinner | 277/188 R |

*Primary Examiner*—Lenard A. Footland

*Attorney, Agent, or Firm*—Hopgood, Calimafde, Kalil, Blaustein & Judlowe

[57] ABSTRACT

The invention contemplates a removable-seal configuration for an axial end of an antifriction bearing wherein seal components are fixedly held by the outer bearing ring and position a seal ring in yieldable circumferentially continuous wiping contact with a seal surface on the inner bearing ring. The component seal parts comprise a stiff annular backing ring, and a stiff removable split ring, with a yieldable annular seal ring compressed between the stiff rings and having the wiping contact with the inner ring. The outer ring has a shouldered groove to retain the component seal parts, the groove having a section of continuously curving contour and being characterized by a convergent ramp with which a similarly sloped bevel of the split ring has wedging contact to derive the indicated compression of the yieldable seal ring.

9 Claims, 4 Drawing Figures

ANTIFRICTION BEARING WITH REMOVABLE SEAL MEANS

BACKGROUND OF THE INVENTION

This invention relates to a removable-seal configuration for an axial end of an antifriction bearing, such as a ball bearing, wherein seal components are fixedly held by the outer bearing ring and position a seal ring in yieldable circumferentially continuous wiping contact with a sloping seal surface on the inner bearing ring.

In one known technique of effecting such a seal, the outer bearing ring has a circumferentially continuous radially inwardly open seal-retaining groove of continuously curved sectional contour between an axially inner abutment shoulder and an axial-end land. An annular seal ring of yieldable material is seated upon the sleeve and against the flange of an inwardly flanged sleeve of deformable metal, and the flange is abutted against the shoulder while the sleeve is inwardly swaged to crimp the seal ring and to outwardly deform the outer limit of the sleeve into tight location within the groove. Such a seal construction is not only not removable without damage, but it is also relatively expensive in that the swaging operation is not necessary to other techniques.

In a second known technique, the seal-retaining groove has a cylindrical bottom, between spaced flat radial sidewalls, the axially inner one of which defines a shoulder for location of component seal parts, namely, an annular backing ring, an annular seal ring of yieldable material, and a split otherwise annular end cap, the latter being inserted in the groove, flat against the outer sidewall of the groove and compressionally loading the seal ring against the backing ring. Such construction has disadvantages including the fact that it is more difficult and therefore more expensive to make the square-sided groove (as compared with a continuously curved groove), and it is difficult to remove and replace the end cap without damage (in that the end cap must be relatively thin and is thus susceptible to damage).

BRIEF STATEMENT OF THE INVENTION

It is an object of the invention to provide an improved seal-bearing construction of the character indicated.

A specific object is to provide a construction enabling a more rugged seal-retaining end cap with superior seal-ring compression-loading capability.

A general object is to meet the above objects with an inherently low-cost construction which permits more simple and seal-effective disassembly and reassembly, for inspection and maintenance of the bearing.

The invention achieves the foregoing objects and other features by providing a seal construction which in the form shown employs an outer race-ring groove having a radial shoulder which is tangent to a continuously curved sectional profile which is characterized by a convergent ramp near the axial end of the outer ring, and the split ring or end cap is beveled at its radially and axially outer rim, at a slope which derives large-area wedging contact with the ramp of the groove. Use of the bevel-to-ramp engagement enables the end cap for a bearing of given size and capacity to be made of substantially thicker material without sacrifice of thickness of the other component parts of the seal, and such engagement also facilitates end-cap assembly and the application of preloading compressional force upon the yieldable material of the seal ring itself.

DETAILED DESCRIPTION

The preferred embodiment of the invention will be described in detail in conjunction with the accompanying drawings, in which.

Figure 1:
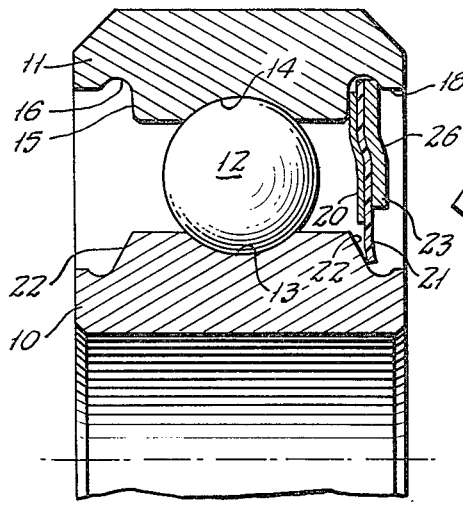
FIG. 1 is a fragmentary sectional view of an antifriction bearing and seal construction of the invention.
Figure 2:
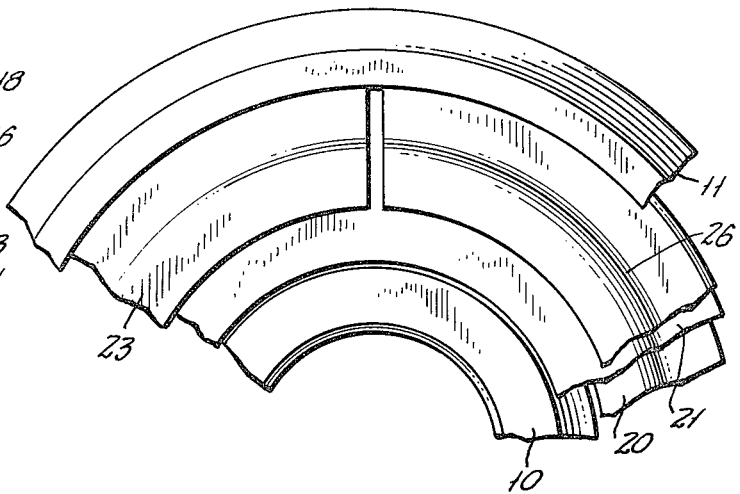
FIG. 2 is a fragmentary end view of the construction of FIG. 1.

The bearing of FIG. 1 comprises an inner ring 10, and an outer ring 11, and interposed antifriction elements in the form of balls 12 riding the respective raceways 13–14 of rings 10–11. Between the outer raceway 14 and either axial end of the bearing, the bore of the outer bearing ring 11 is characterized by a radial-shoulder portion 15 (see FIG. 3) to which a groove 16 (of continuously curved sectional contour) is tangent; and the groove 16 terminates via a ramp 17 to a land 18 at the axial end of outer ring 11. In the form shown, the ramp 17 is defined by reverse curvature of the predominant curve of groove 16, and the reverse curvature continues into tangency with land 18. The section point of inflection between the two curvatures occurs at a diameter $D_1$ which is well within the radial span between the land diameter $D_2$ and the groove-bottom diameter $D_3$, and it is noted that the effective height of shoulder 15 beyond land 18 is determined by the lesser diameter $D_4$. It is preferred that the convergent-surface slope at the section point of inflection be in the range 40 to 55 degrees, e.g., 45 degrees, with respect to the axis of the bearing.

The component seal parts which are fitted to the groove 16 comprise a stiff annular backing-ring member or plate 20, having an outer diameter to clear the land 18 and to enable firm abutment with shoulder 15, and an inner diameter to clear the inner bearing ring 10; an annular seal-ring member 21 of yieldable material having an outer diameter to enter groove 16 and having an inner diameter for resiliently loaded wiping contact with a sloping seal surface 22 of the inner bearing ring; and a split otherwise annular endcap or ring member 23 of relatively stiff material. The end-cap member 23 has an outer diameter $D_5$ greater than that ($D_1$) of the indicated section point of inflection, and its inner diameter is about halfway between the bearing pitch diameter and the inner ring outer diameter, to provide a degree of axial deflection for resilient loading of the wiping contact of seal ring 21 with the inner-ring seal surface 22.

Figure 3:
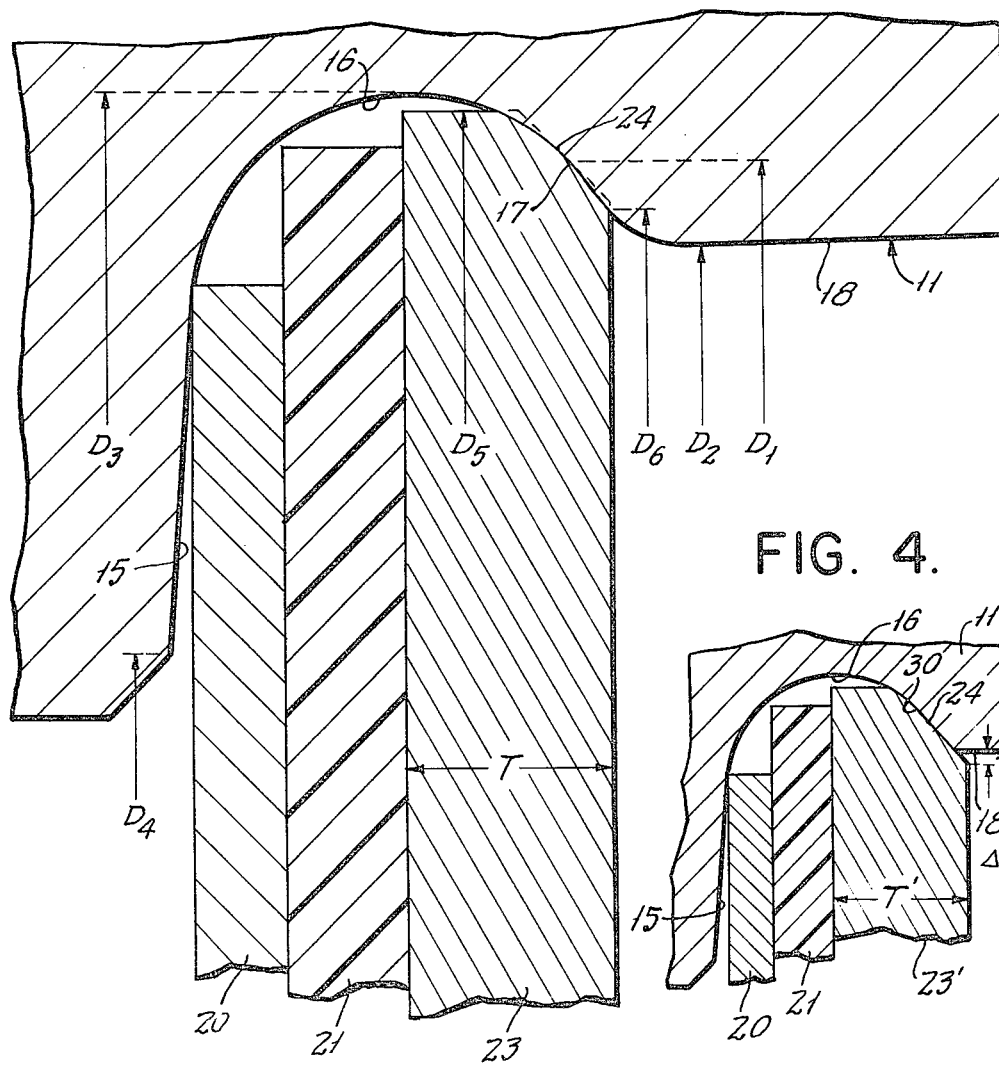
FIG. 3 is an enlarged fragmentary sectional view of parts relationships at the region of engagement of seal components with the outer race-ring of the bearing of FIG. 1.

In accordance with a feature of the invention, the end-cap member 23 is of substantially greater thickness T (for example, twice) that which was affordable in multiple-part seals of the above-indicated nature, and a circumferentially continuous bevel 24 of relatively extensive area is defined at the radially and axially outer corner of member 23, the slope of bevel 24 being substantially in accordance with that indicated at the section point of inflection of the groove (16) surface. As seen in FIG. 3, the end-cap thickness may be at least 50 percent devoted to the bevel 24, and the inner-limit diameter $D_6$ of the bevel 24 may still be in excess of the land diameter $D_2$, thus placing the bevel 23 fully within groove 16, for an assembled-seal relationship.

For self-centering support purposes, and to provide an enlarged interior volume for containment of bearing lubricant, the stiff component members 20-23 of the seal construction are in axially dished register, providing an axially outward offset at a location 26 intermediate their inner and outer radial limits. And it will be understood that seal ring 22, being yieldable, adopts the same offset 26 when compressionally sandwiched by members 20-23. The stiff members 20-23 may suitably be of stamped sheet steel, of hardness materially less than that of the outer bearing ring 11.

The groove width and thickness of the component seal parts 20-21-23 should be such that upon placement of end-cap member 23 into its wedging contact with ramp 17, a firm and circumferentially continuous axial pressure will be applied to the seal ring 21. The wedging contact is over an extensive area because the softer material of the end cap 23 is slightly deformed (brinelled) as it attempts to restore itself to its unstressed outer diameter $D_5$ after undergoing transient radially inward deformation in the process of insertion past land 18.

It will be seen that the described seal and seal-seating configuration meets all stated objects. Significant to the durability and reliability of the construction after repeated removal and replacement of the seal parts is the fact that the removable end cap 23 may be at least twice as thick as is conventional for multiple-part seals which seat in square-walled grooves. The extra thickness permits a bevel 24 of substantial circumferentially continuous seating area; and eventhough the end cap 23 is less hard than the ramp surface it engages, it nevertheless is sufficiently stiffly compliant to be able to maintain a constant radially outward preload force at contact with the ramp. By wedge reaction at the ramp, this radially outward preload force translates into axially compressive force upon the other seal components 21-20.

Figure 4:
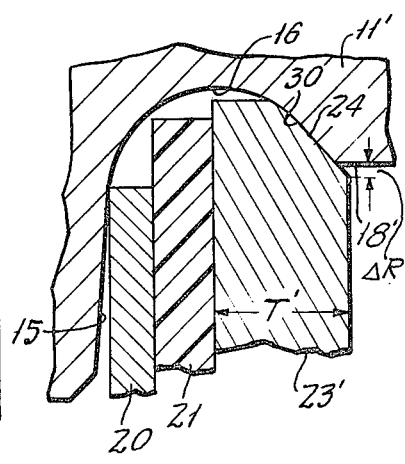
FIG. 4 is a simplified fragmentary sectional view of a modified parts relationship.

While the invention has been described in detail for a preferred form, it will be understood that modifications may be made without departure from the claimed invention. For example, in the modification of FIG. 4, the groove 16 is characterized by a frusto-conical ramp surface 30 which is tangent to the curved profile of groove 16 and which is of slope to match that of end-cap bevel 24. There is no reverse curvature of the section profile of groove 16, and the surface 30 terminates at intersection with land 18'. The thickness T' of end-cap member 23' is greater than the thickness T shown for member 23 in FIG. 3, thus providing an access overhang $\Delta R$ via which a tool may be inserted, for more ready manipulative access to member 23', as when removing the same to renew seal member 21 or otherwise to service the bearing. The increased thickness T' provides more resistance to radial contraction and subsequent unwanted disassembly of split end cap member 23' from the bearing. Additionally, the extended area of engagement of surfaces 24-30 enables ready translation of radially outward preload force into axially compressive force upon the other seal components 21-20, as discussed for FIG. 3.

What is claimed is:

1. A sealed antifriction bearing wherein the bearing comprises inner and outer race rings with interposed antifriction elements riding the races of said rings, the outer ring having a circumferentially continuous radially inwardly open seal-retaining groove of continuously curved sectional contour between an axially inner abutment shoulder and an axial-end land of diameter greater than the inner diameter of said shoulder, the axially outer end of said groove contour being characterized by a ramp substantially tangent to said continuously curved contour, said inner ring having a sloping seal surface in substantially axial registry with said groove, said ramp converging toward said land in the axially outward direction; and seal elements comprising a first stiff annular backing ring of diameter to clear said land and in abutment with said shoulder, said backing ring having clearance with said inner race ring, an annular seal ring of yieldable material in radially overlapping abutment with said backing ring and having yielding circumferentially continuous seal contact with said seal surface, and a split otherwise annular cap ring of stiffly compliant material of unstressed outer diameter intermediate the diameter of said land and the groove-bottom diameter, said cap ring compressionally abutting said seal ring and having an axially outer and radially outer corner bevel in wedging engagement with said ramp.

2. The bearing of claim 1, in which said backing ring and said cap ring have registering axially outwardly dished annular offsets between the radially inner and outer limits of said backing and cap rings.

3. The bearing of claim 1, in which the material of said race rings has greater surface hardness than that of said split ring.

4. The bearing of claim 1, in which the material of said seal ring includes polytetrafluoroethylene as an essential ingredient.

5. The bearing of claim 1, in which the section point of tangency of said ramp with the continuously curving contour of said groove is substantially the section point of inflection between the predominant first direction of groove curvature and a reversely curved ramp transition into substantial tangency with said land.

6. The bearing of claim 1, in which the unstressed outer diameter of said end-cap member is greater than the diameter at which said ramp is tangent to the section curvature of said groove.

7. A sealed antifriction bearing wherein the bearing comprises inner and outer race rings with interposed antifriction elements riding the races of said rings, the outer ring having a circumferentially continuous radially inwardly open seal-retaining groove of continuously curved sectional contour extending from an axially inner abutment shoulder and intercting with an axial-end land of diameter greater than the inner diameter of said shoulder, the axially outer end of said groove contour being characterized by a frusto-conical ramp substantially tangent to said continuously curved contour, said inner ring having a sloping seal surface in substantially axial registry with said groove; and seal elements comprising a first stiff annular backing ring of diameter to clear said land and in abutment with said shoulder, said backing ring having clearance with said inner race ring, an annular seal ring of yieldable material in radially overlapping abutment with said backing ring and having yielding circumferentially continuous seal contact with said seal surface, and a split otherwise annular cap ring of stiffly compliant material of unstresssed outer diameter intermediate the diameter of said land and the groove-bottom diameter, said cap ring compressionally abutting said seal ring and having an axially outer and radially outer corner bevel in wedging engagement with said ramp.

8. The bearing of claim 7, in which said ramp and said bevel are of substantially the same slope.

9. The bearing of claim 7, in which the axial end of said bevel is of diameter less than the adjacent diameter of said land.

* * * * *